United States Patent

Araki

[11] Patent Number: 6,151,056
[45] Date of Patent: Nov. 21, 2000

[54] LASER SCAN BASED RECORDING APPARATUS

[75] Inventor: Yoshiyuki Araki, Tokyo, Japan

[73] Assignee: Asahi Kogaku Kogyo Kabushiki Kaisha, Tokyo, Japan

[21] Appl. No.: 08/966,810

[22] Filed: Nov. 10, 1997

[30] Foreign Application Priority Data

Nov. 11, 1996 [JP] Japan .................................. 8-298344

[51] Int. Cl.[7] .................................................. B41J 2/47
[52] U.S. Cl. ........................ 347/246; 347/247; 347/261; 250/205
[58] Field of Search .................................. 347/246, 247, 347/248, 253, 261, 255; 250/205, 236

[56] References Cited

U.S. PATENT DOCUMENTS

| | | | |
|---|---|---|---|
| 4,201,944 | 5/1980 | Beunders | 455/155.1 |
| 5,001,341 | 3/1991 | Negishi | 250/235 |
| 5,248,997 | 9/1993 | Summers | 347/261 |
| 5,461,414 | 10/1995 | Honda et al. | 347/250 |

FOREIGN PATENT DOCUMENTS

| | | |
|---|---|---|
| 53-37029 | 4/1978 | Japan . |
| 4162013 | 6/1992 | Japan . |

*Primary Examiner*—N. Le
*Assistant Examiner*—Hai C. Pham
*Attorney, Agent, or Firm*—Greenblum & Bernstein P.L.C.

[57] ABSTRACT

In a laser scanning apparatus having a polygonal mirror, the laser light reflected from the multiple reflecting surfaces of polygonal mirror is detected with a photosensor. The respective detection outputs are stored in associated storage media (sample and hold circuits). When a certain reflecting surface has been rotated to the next laser light scan position, the detection output for the previous laser light scan is read out of the storage medium. A correction voltage is generated on the basis of the thus read detection output and the reference voltage is corrected with the generated correction voltage. Since the emission output of laser diode is controlled on the basis of the corrected reference voltage, the photoreceptor can be scanned with laser light of constant optical intensity despite the variation in the reflectance of laser light among the multiple reflecting surfaces of the polygonal mirror.

15 Claims, 6 Drawing Sheets

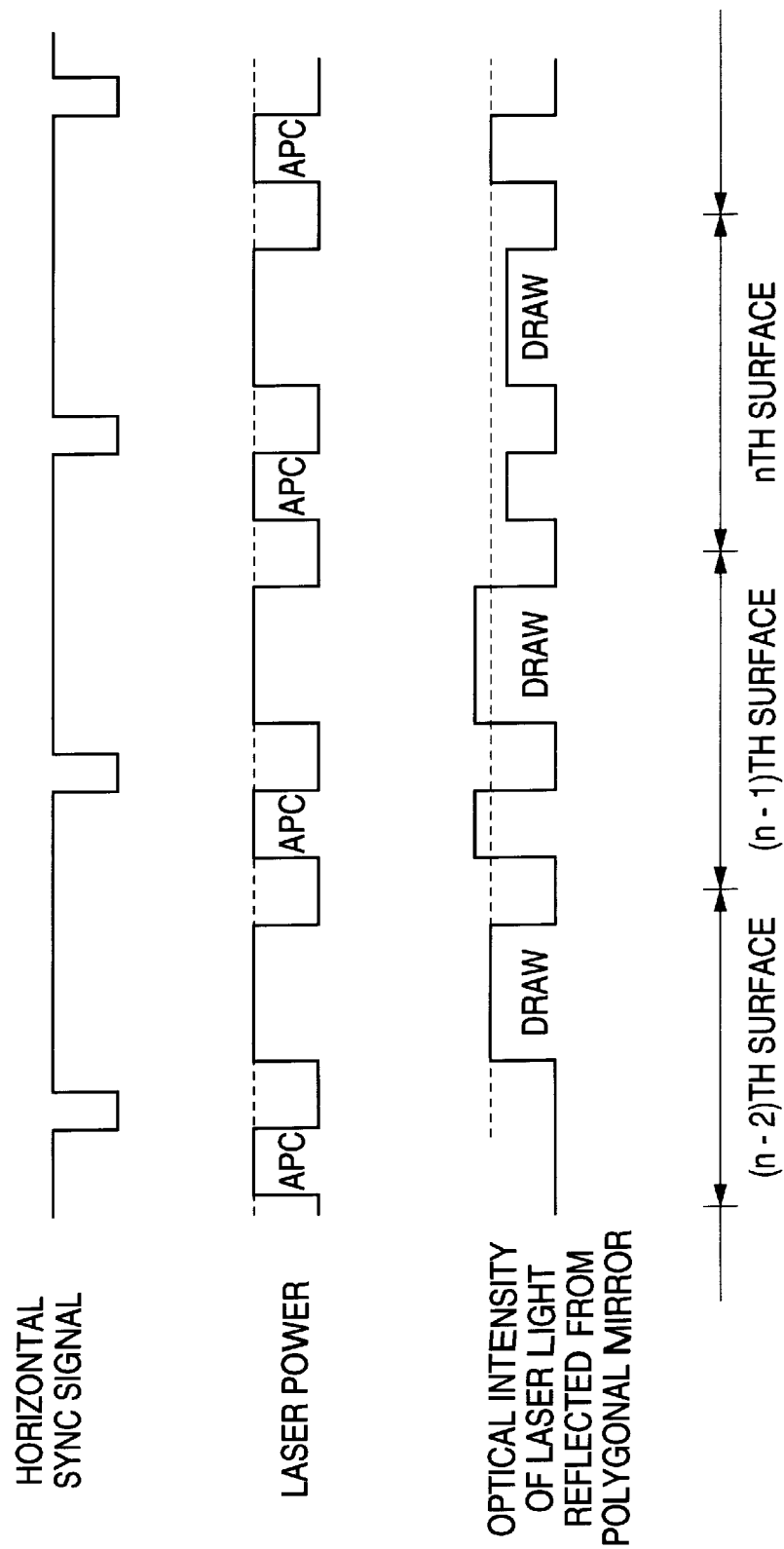

LASER SCAN BASED RECORDING APPARATUS

BACKGROUND OF THE INVENTION

The present invention relates to a laser scan based recording apparatus for use with laser printers and the like to record information using laser light to scan the photosensitive surface of a photoreceptor with a rotating polygonal mirror. The invention relates specifically to an apparatus for adjusting the optical intensity of laser light being applied to the photosensitive surface of the photoreceptor.

Laser scan based recording apparatus of the type contemplated by the invention are adapted to be such that laser light emitted from a laser light source is projected on a reflecting surface of a rotatably driven polygonal mirror. As the polygonal mirror revolves, the direction of the laser light reflected from the reflecting surfaces of the polygonal mirror is changed so as to scan the photosensitive surface of a photoreceptor with the reflected light, thereby drawing an image in lines. In order to attain a uniform image density, the optical intensity of the laser light issuing from the laser light source (the intensity is hereunder referred to as "laser power") must be controlled at a specified level. To this end, the intensity of the laser light issuing from the laser light source is detected and the laser power is controlled on the basis of the detected value. This technique is generally called "APC (automatic power control)", and its operational concept is shown in FIG. 5. The optical intensity of laser light emitted from a laser diode LD in a laser light source 1 is detected with a monitoring photodiode PD. The resulting detection current Im is converted to voltage in a I/V (current/voltage) converter 11, followed by comparison with a reference voltage Vref in a comparator 12. The resulting comparison output Vo is held in a sample and hold circuit 13, from which it is fed into a laser drive circuit 14 capable of V/I (voltage/current) conversion. In the laser drive circuit 14, the current to drive the laser diode LD is controlled such that the laser power is controlled to a specified value.

A problem with this approach of controlling the laser power to a specified level is that if the intensity of laser light varies due to various factors that occur in the optical path from the laser light source to the photosensitive surface, it becomes difficult to ensure the desired uniform image density. One such factor is the variation in the reflectance of laser light from the individual reflecting surfaces of the polygonal mirror. If different reflecting surfaces produce different reflectances of laser light, the intensity of the laser light reflected from the successive reflecting faces also varies, causing differences in the densities of the scan lines created by the laser light reflected from the successive reflecting surfaces. The reflecting surfaces of the polygonal mirror are initially designed to reflect the incident light at the same reflectance. However, as the polygonal mirror revolves at high speed, dust and other particles in air collect on the reflecting surfaces. Because of this and other reasons, the reflectance of laser light from each reflecting surface will vary over time, eventually causing variations of about 3 to 4% in the reflectance of laser light from the respective reflecting surfaces. Such variations in reflectance are not a big problem in binary level recording which forms an image by turning on and off the laser light. On the other hand, with color printers or the like which require the production of a halftone image, density control is necessary for providing at least 256 levels of contrast. To meet this need, the variation in the reflectance of laser light should not exceed 1%.

In order to deal with the problem of variation in the reflectance of laser light from each reflecting surface of the polygonal mirror, the detection of the intensity of laser light in the practice of APC may be performed in a position downstream of the polygonal mirror, preferably in the neighborhood of the photosensitive surface of the photoreceptor. In this way, the optical intensity of the laser light actually reflected by the polygonal mirror is detected and by controlling the laser power on the basis of the detection output. Uniformity can then be assured in the profile of laser light intensity on the photosensitive surface. For example, Unexamined Published Japanese Patent Application Nos. 37029/1988 and 162013/1992 propose a beam recording apparatus which detects the intensity of laser light just before it scans the photosensitive surface of photoreceptor drum and controls the laser power on the basis of the detected value of laser light intensity. More specifically, the optical intensity output of laser light is detected with a photosensor provided in the neighborhood of the photoreceptor drum. Its peak is held and fed back to an APC circuit, which uses the thus held sensor output to control the laser light modulator, as well as the semiconductor laser generator serving as the laser light source.

According to the technique just described above, the laser power control is solely based on the laser light intensity detected with the photosensor provided just before the photoreceptor drum. This occasionally causes the following problem. Prior to the projection of laser light on the photosensor as in the initial state or if the laser light fails to be projected on the photosensor due, for example, to a vertical offset in laser scanning, the output of the photosensor is almost zero, so the APC circuit will control the laser power toward a maximum level. This causes the laser light source and the optical modulator to operate with a maximum level of laser power, as is typically the case of failure of the laser light to be projected on the photosensor. If the laser light source is continuously driven to produce a maximum power, the semiconductor laser generator may potentially break due to the overdrive. In the other case, the repeated variation in laser power from the maximum to a specified level eventually shortens the life of the semiconductor laser generator.

SUMMARY OF THE INVENTION

An object, therefore, of the present invention is to provide a laser scan based recording apparatus that is protected not only against the variation in draw density due to the variation in the reflectance of laser light by each reflecting surface of the polygonal mirror, but also against overdriving of a laser light source and the variation in laser power, to produce consistent and highly reliable operation.

The stated object of the invention is attained by a laser scan based recording apparatus in which laser light emitted from a laser light source is reflected by a polygonal mirror to scan a photoreceptor. A mechanism detects the optical intensity of the laser light reflected from each of the reflecting surfaces of the polygonal mirror. A mechanism stores the detection outputs individually. A mechanism reads the previously stored detection output when the laser light next scans at the reflecting surface for which the reflectance has been measured. A mechanism calculates a correction voltage in association with the thus read detection output and corrects a reference voltage by the correction voltage. An emission output control mechanism controls the emission output of the laser light source on the basis of the thus corrected reference voltage.

In a preferred embodiment of the invention, the apparatus includes a laser diode, a rotatably driven polygonal mirror having a plurality of reflecting surfaces for directing the laser light from the laser diode to scan a photoreceptor, a photosensor for detecting the laser light reflected from said reflecting surfaces, a storage mechanism which stores for each reflecting surface the voltage associated with the optical intensity detected with the photosensor, a mechanism that reads the stored voltage from the storage mechanism when the reflecting surface is rotated the scan position for the next cycle, a computing mechanism that calculates a correction voltage from the read voltage and corrects a reference voltage on the basis of the correction voltage, and a laser output control circuit for controlling the emission output of the laser diode on the basis of the thus corrected reference voltage.

In a particularly preferred case, the reference voltage correcting means includes a number of sample and hold circuits equal to the number of reflecting surfaces of the polygonal mirror and which sample and hold the detection outputs of the photosensor for the laser light reflected from the individual reflecting surfaces. A write selecting mechanism synchronous with the rotation of the polygonal mirror, selects one of the sample and hold circuits and causes it to perform sampling and holding operations. A read selecting mechanism synchronous with the rotation of the polygonal mirror, selects one of the sample and hold circuits which leads said sample and hold circuit by one scan cycle and reads the voltage its holds. A computing mechanism takes the difference between the voltage read out of the read selecting mechanism and the reference voltage to determine a correction voltage and corrects the reference voltage by the correction voltage.

It is also preferred that the laser output control circuit includes a mechanism which selects between the reference voltage and the corrected reference voltage and selects the reference voltage when the polygonal mirror is to fully rotate once for the first time.

The present disclosure relates to the subject matter contained in Japanese patent application No. 8-298344 filed on Nov. 11, 1996 which is expressly incorporated herein by reference in its entirety.

BRIEF DESCRIPTION OF THE DRAWINGS

In the accompanying drawings:

FIG. 6 is a timing chart describing the operation of APC by the APC circuit shown in FIG. 5.

DESCRIPTION OF THE LASER SCAN BASED RECORDING APPARATUS

Figure 1:
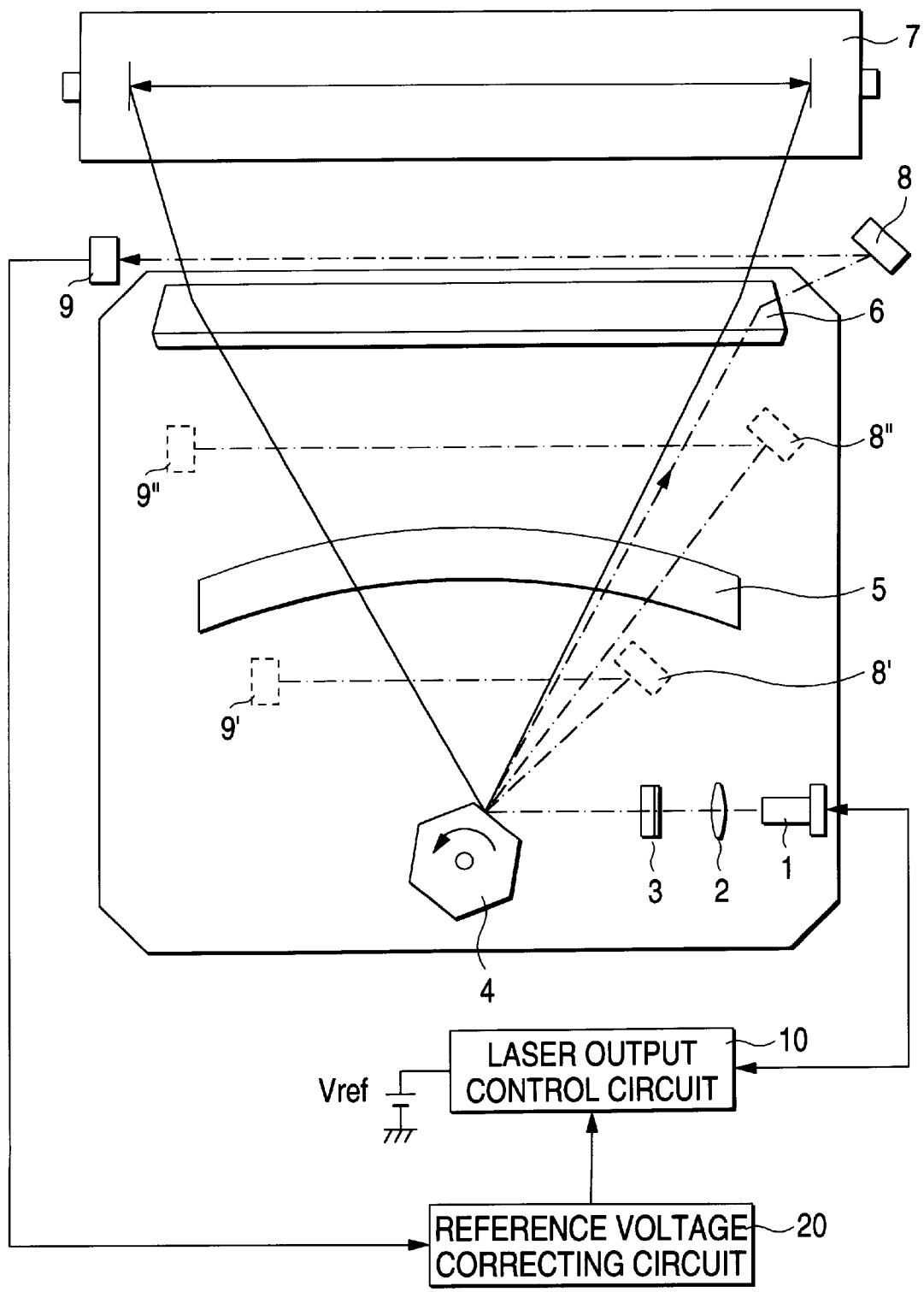
FIG. 1 is a diagram showing the design concept of a laser scan based recording apparatus.

FIG. 1 is a conceptual diagram showing the general layout of a laser scan based recording apparatus. A semiconductor laser 1 as a laser light source emits laser light. A collimator lens 2 produces a parallel beam of the laser light. A cylindrical lens 3 shapes the laser beam. Lenses 2 and 3 are disposed in the optical path of the laser light. The shaped laser beam is projected on a polygonal mirror 4. The polygonal mirror 4 is formed as a hexagonal prism. Its six lateral sides are each provided with a reflector. The polygonal mirror 4 is driven to rotate counterclockwise (as indicated by the arrow) rapidly about the central axis. This laser light reflected from the polygonal mirror 4 is transmitted through an fθ lens 5 with the direction of reflection being synchronous with the rotation of the polygonal mirror 4. The transmitted laser light is reflected by a reflector mirror 6 and projected on the photosensitive surface of a photoreceptor drum 7 such that it is scanned in the main scanning direction. The angular velocity of deflection of the reflected laser light is corrected by the fθ lens 5 to provide a uniform scan speed on the photoreceptor drum 7. The photoreceptor drum 7 is rotated about its own axis, thereby effecting auxiliary scan. Further, a reflector mirror 8 is provided outside the image drawing region of the photoreceptor drum 7 and in a position close to the end where scanning with the laser light starts. A photosensor 9 is provided to detect the reflected laser light from the mirror 8 thereby producing a scan timing signal. The photosensor 9 is also used to detect the optical intensity of the reflected laser light.

The semiconductor laser 1 is an integral assembly of the laser diode LD and the monitoring photodiode PD. The optical intensity of laser light emitted from the laser diode PD is detected with the monitoring photodiode PD. In general, the photodiode PD is located behind the laser diode LD, i.e. a position opposite from the polygonal mirror 4 with respect to the laser diode LD, to receive the back light from the laser diode LD. On the basis of comparison between the detection (i.e., detected) output and a reference voltage, a laser output control circuit 10 controls the emission output of the laser diode LD. The photosensor 9 for producing the scan timing signal is used as a detector of the optical intensity of laser light reflected from each reflecting surface of the polygonal mirror 4 for scanning. A reference voltage correcting circuit 20 is provided to correct the reference voltage for the laser output control circuit on the basis of the detection output from the photosensor 9.

Figure 2:
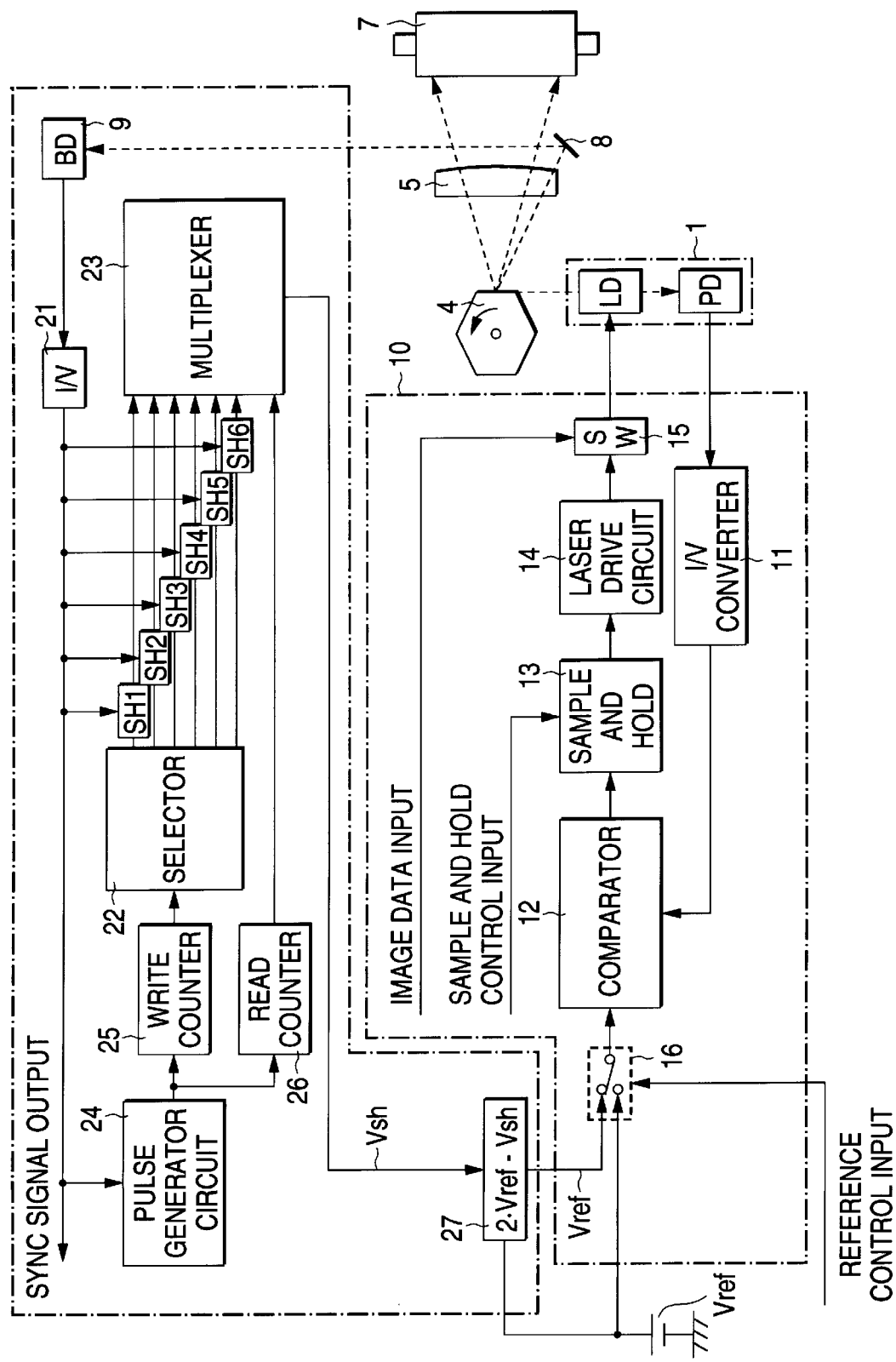
FIG. 2 is a circuit diagram showing the configuration of the APC circuit in the apparatus.

FIG. 2 is a circuit diagram showing the configurations of the laser output control circuit 10 and the reference voltage correcting circuit 20. The laser output control circuit 10 includes an I/V converter 11 which performs I/V conversion on the detection current indicative of the optical intensity of the laser light emitted from the laser diode LD which has been detected with the monitoring photodiode PD, a comparator 12 for comparing the resulting voltage with a reference voltage Vref, a sample and hold circuit 13 in which a comparison voltage as the comparison output of the comparator 12 is sampled and held in response to an APC timing signal, a laser drive circuit 14 having a V/I converting capability which generates a drive current to the laser diode LD on the basis of the thus held comparison voltage, and a drive switch 15 which is turned on and off in response to signals for turning on and off the emission of laser light from the laser diode LD such that current generated in the laser drive circuit 14 is fed to the laser diode LD at a predetermined timing. The output of the reference voltage Vref generator is connected to a reference selection switch 16 for selecting between the reference voltage Vref and the output of the reference voltage correcting circuit 20 in response to a reference selection signal which is output from a central processing unit (not shown). It should be noted that the APC timing signal and the signals to turn on and off the laser diode LD are output from the central processing unit synchronous with the rotation of the polygonal mirror 4.

The reference voltage correcting circuit 20 includes an I/V converter 21 in which the detection current from the photosensor 9 is converted to voltage, six sample and hold circuits SH1 to SH6 for sampling and holding the resulting voltage in association with the respective reflecting surfaces of the polygonal mirror, a selector 22 for selectively operating these sample and hold circuits, and a multiplexer 23 for selectively outputting one of the voltages held in the sample and hold circuits SH1 to SH6. The reference voltage correcting circuit 20 further includes a pulse generator circuit 24 for generating pulses synchronous with the scan timing signal on the basis of the detection current from the photosensor 9, a write counter 25 for counting the pulses from the pulse generator circuit 24 and actuating the selector 22, and a read counter 26 for counting the pulses from the pulse generator circuit 24 and actuating the multiplexer 23. The counters 25 and 26 are each adapted as a ring counter which counts the values of "1" to "6" around a loop in an order sequence that coincides with the direction of rotation of the six reflecting surfaces of the polygonal mirror 4, except that the read counter 26 counts values which are always "+1" leading the values counted by the write counter 25. Therefore, when the write counter 25 actuates the selector 22 so that the sample and hold circuit $SH_n$, samples and holds the voltage indicative of the optical intensity of the laser light reflected by the n-th surface of the polygonal mirror 4, the read counter 26 actuates the multiplexer 23 to output the voltage, which has already been held by the sample and hold circuit $SH_{n+1}$, as a value indicative of the optical intensity of the laser light reflected by the n+1-th surface of the polygonal mirror 4. The multiplexer 23 is connected to a computing circuit 27 which performs predetermined calculations on the selected output voltage from the multiplexer 23 to calculate a correction voltage and corrects the reference voltage Vref on the basis of the correction voltage. The corrected reference voltage Vref' is output to the reference selection switch 16 in the laser output control circuit 10. The reference voltage correcting circuit 20 is so designed that it outputs the corrected reference voltage Vref' equal to the reference voltage Vref if no abnormal deterioration occurs on an optical path from the laser diode through the polygonal mirror 4 to the photosensor 9. To this end, a conversion ratio of the I/V converter 21 is set at a predetermined value, taking into account a difference between quantities of the laser light received by the photodiode PD and the photosensor 9.

The procedure of APC in the laser scan based recording apparatus is described. The central processing unit (not shown) outputs an APC timing signal and on/off signals synchronous with the rotating cycle of the polygonal mirror 4. In response to these signals, the laser output control circuit 10 turns on the drive switch 15, whereupon the laser drive circuit 14 supplies a drive current to the laser diode LD which, in turn, is activated for laser light emission. The laser light emitted from the laser diode LD is received by the monitoring photodiode PD. The detection current representing the optical intensity of that laser light is converted to voltage in the I/V converter 11 and compared with the reference voltage Vref in the comparator 12. As the result of this comparison with the reference voltage, a comparison voltage Vo representing the difference between the two inputs is output. In response to the APC timing signal, the comparison voltage Vo is sampled and held in the sample and hold circuit 13 at the APC timing. The thus held comparison voltage is input to the laser drive circuit 14, where it is subjected to V/I conversion and output as a drive current. In this way, the drive current from the laser drive circuit 14 is controlled by the detection current from the monitoring photodiode PD such that the emission output of the laser diode LD is subjected to feedback control to provide an optical intensity associated with the reference voltage Vref.

The thus controlled laser light emission from the laser diode LD is projected onto a reflecting surface of the polygonal mirror 4 which has rotated to receive the laser light from the laser diode LD. The reflected laser light passes through the fθ lens 5 to scan the photoreceptor drum 7 via the reflecting mirror 6, as already described above. On the other hand, at a timing prior to the scanning of the photoreceptor drum 7, the laser light reflected from each reflecting surface of the polygonal mirror 4 is reflected by the reflecting mirror 8 and received by the photosensor 9 which, in turn, outputs a scan timing signal. The scan timing signal from the photosensor 9 is used as a sync signal in the main scanning direction which provides a reference for the various timing signals coming from the central processing unit.

The detection current from the photosensor 9 is converted to voltage in the I/V converter 21. Part of the voltage is input to the central processing unit to generate the sync signal in the main scanning direction. At the same time, it is input to the pulse generator circuit 24 as a scan timing signal for APC. The pulse generator circuit 24 generates pulses synchronous with the scan timing, which are input to the write counter 25 and the read counter 26. The write counter 25 counts the input pulses and on the basis of the resulting count the selector 22 selects one of the six sample and hold circuits SH1 to SH6 in an ordered sequence. A selected sample and hold circuit holds the voltage from the I/V converter 21 at the relevant timing. Thus, the voltages representing the optical intensities of the laser light reflected from the six reflecting surfaces which are successively rotated to the scan position by the rotation of the polygonal mirror 4 are successively stored in the sample and hold circuits SH1 to SH6.

The read counter 26 counts values "+1" greater than those counted by the write counter 25, so the voltages from the sample and hold circuits SH1 to SH6 associated with the resulting counts are read from the multiplexer 23 in an ordered sequence. As a result, a voltage already detected with the photosensor 9 is read in connection with the reflecting surface which is to perform scanning right after the reflecting surface currently in scan mode (the former is hereunder designated as "the next reflecting surface"). Stated more specifically, the laser light from the next reflecting surface is preliminary detected with the photosensor 9 from one previous cycle of rotation of polygonal mirror 4. After the polygonal mirror 4 revolves one rotation, the voltage stored in the corresponding sample and hold circuit is read just before scanning with the next reflecting surface. The thus read voltage Vsh is supplied into the computing circuit 27, where the difference from the reference voltager Vref (ΔVref=Vref−Vsh) is calculated and determined as a correction voltage. By adding the correction voltage ΔVref to the reference voltage Vref, the corrected reference voltage Vref' is output to the reference selection switch 16. Briefly, the computing circuit 27 performs the mathematical operation 2Vref−Vsh and outputs the corrected reference voltage Vref'.

The corrected reference voltage Vref' is input as a reference voltage to the error comparator 12 via the reference selection switch 16 at a timing just before scanning is performed with the corresponding reflecting surface. Suppose here that the detection voltage which represents the optical intensity of the laser light from the laser diode LD as detected by the monitoring photodiode PD is constant. If the voltage Vsh which is read from any one of the sample and hold circuits SH1 to SH6 via the multiplexer 23 is higher than the reference voltage Vref, this means that the reflectance of the laser light from the corresponding reflecting surface is high enough to provide a high optical intensity for the laser light detected by the photosensor 9. Therefore, the correction voltage ΔVref takes a negative (minus) value, the reference voltage Vref' to be input to the comparator 12 is reduced, and thus the comparison voltage Vo from the same comparator is decreased (Vo=−V+Vref', V: the output of the I/V converter 11). Subsequently, the next reflecting surface is rotated to the scan position and at the APC timing determined by the scan timing signal from the photosensor 9 and the comparison voltage Vo is sampled and held and input to the laser drive circuit 14, whereupon the drive current to the laser diode LD is corrected to a smaller value. This is how the laser output control circuit 10 lowers the optical intensity of the laser light from the laser diode LD when the reflecting surface moving to the scan position has a comparatively high reflectance of laser light; as a consequence, the optical intensity of the laser light reflected from the reflecting surface of interest is held at a specified level.

Conversely, if the reflectance of laser light from the reflecting surface is comparatively low, the voltage Vsh which is read from any one of the sample and hold circuits SH1 to SH6 via the multiplexer 23 is lower than the reference voltage Vref; hence, the correction voltage ΔVref takes a positive (plus) value, the reference voltage Vref' to be input to the comparator 12 is increased, and thus the comparison voltage Vo from the same comparator is increased. Therefore, when the next reflecting surface is rotated to the scan position, the drive current to the laser diode LD is corrected to a greater value. As a result, the optical intensity of laser light from the laser diode LD which is opposite the reflecting surface moving to the scan position is sufficiently increased to ensure that the optical intensity of the laser light reflected from the reflecting surface of interest is held at the specified level.

Figure 3:
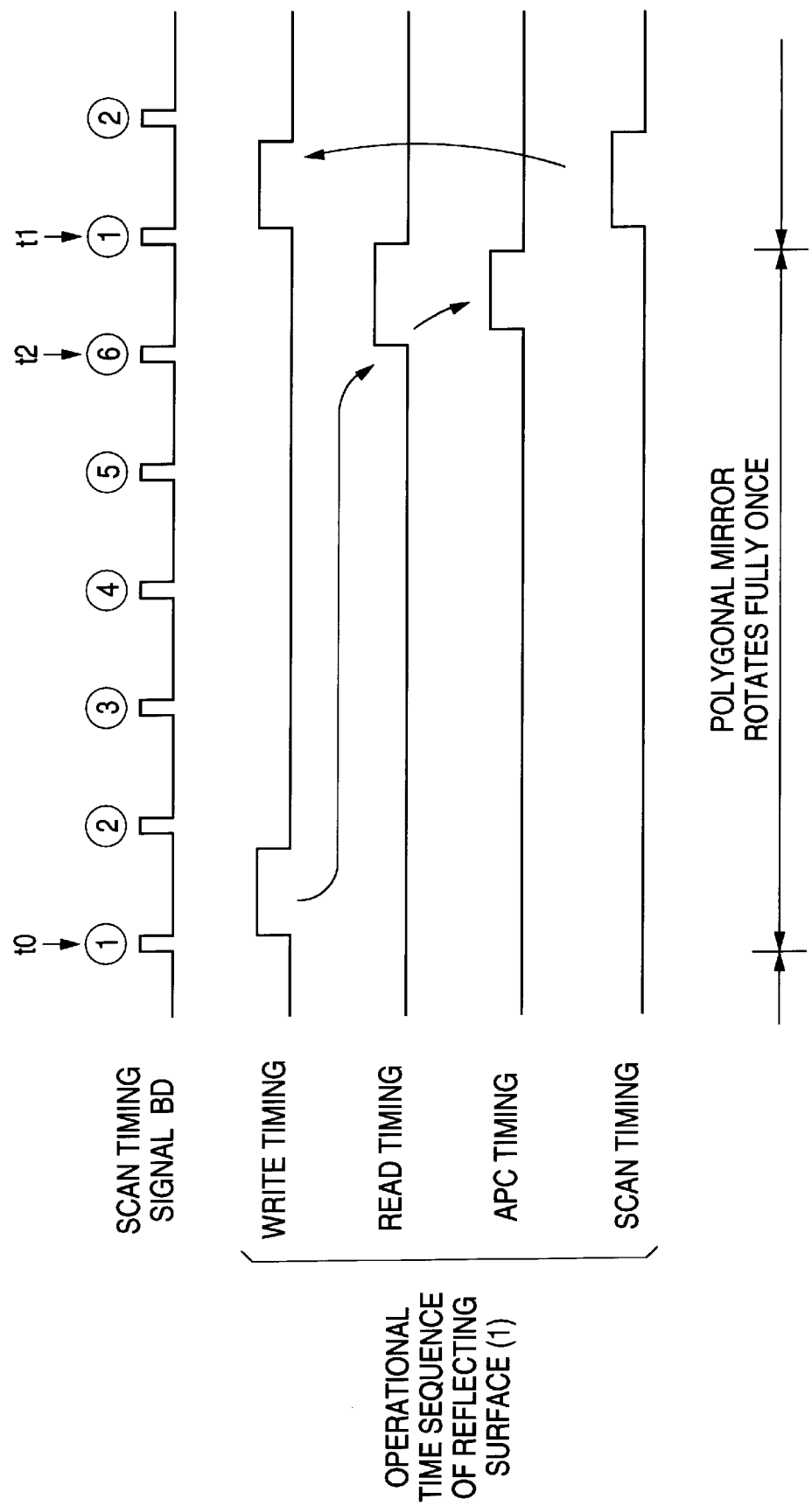
FIG. 3 is a timing chart describing the operation of APC by the apparatus.

FIG. 3 is a timing chart for illustrating the above-described operation of the laser output control circuit 10, assuming that the six reflecting surfaces of the polygonal mirror are numbered (1) to (6) and the scan timing signal from the photosensor 9 is designated BD. Suppose that the first reflecting surface (1) scans with laser light at time t1. Given these conditions, the voltage detected with the photosensor 9 at time t0, which is one rotation before the scanning with the first reflecting surface, is written into a sample and hold circuit. At time t2 which is just before t1 (namely, when the first reflecting surface has been rotated to a position where it is the next to perform scanning), the voltage recorded at time t0 is read from the sample and hold circuit and APC is performed on the basis of that voltage just before time t1. In addition, the voltage at time t0 which has been stored in the sample and hold circuit is refreshed (stored again in the sample and hold circuit) at time t1 where APC is performed to effect scanning. The thus refreshed voltage is used for APC in the next rotation of the polygonal mirror. Thus, the voltage representing the state of reflection of a reflecting surface in a scan mode, which is one rotation before is stored in a sample and hold circuit, ensures that APC can be performed in a precise manner which accommodates variations over time.

Figure 4:
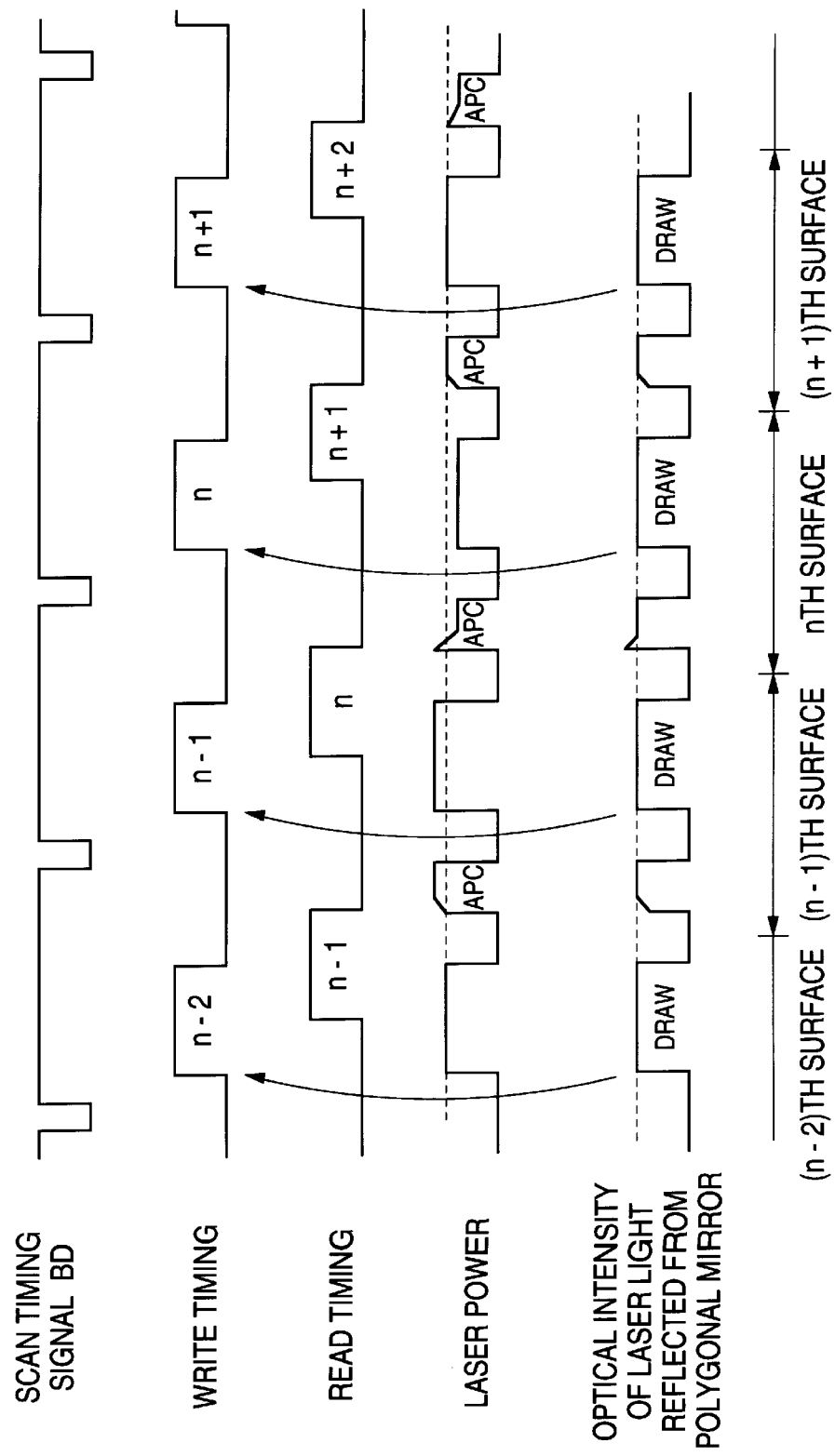
FIG. 4 is another timing chart describing the operation of APC by the apparatus.

FIG. 4 is a timing chart for the APC to be performed in the apparatus, assuming that among the six reflecting surfaces of the polygonal mirror, three adjacent surfaces, (n−1)th, nth and (n+1)th, have light reflectances (R−1), R(n) and R(n+1), respectively, which satisfy the relation R(n−1)<R(n+1)<R(n). Hence, compared to the laser output for scanning with the (n+1)th reflecting surface, the laser power of the laser diode for scanning with the (n−1)th reflecting surface is increased whereas the laser power of the laser diode for scanning with the nth reflecting surface is reduced, such that the optical intensity of laser light reflected from each reflecting surface is controlled at a specified level.

Figure 5:
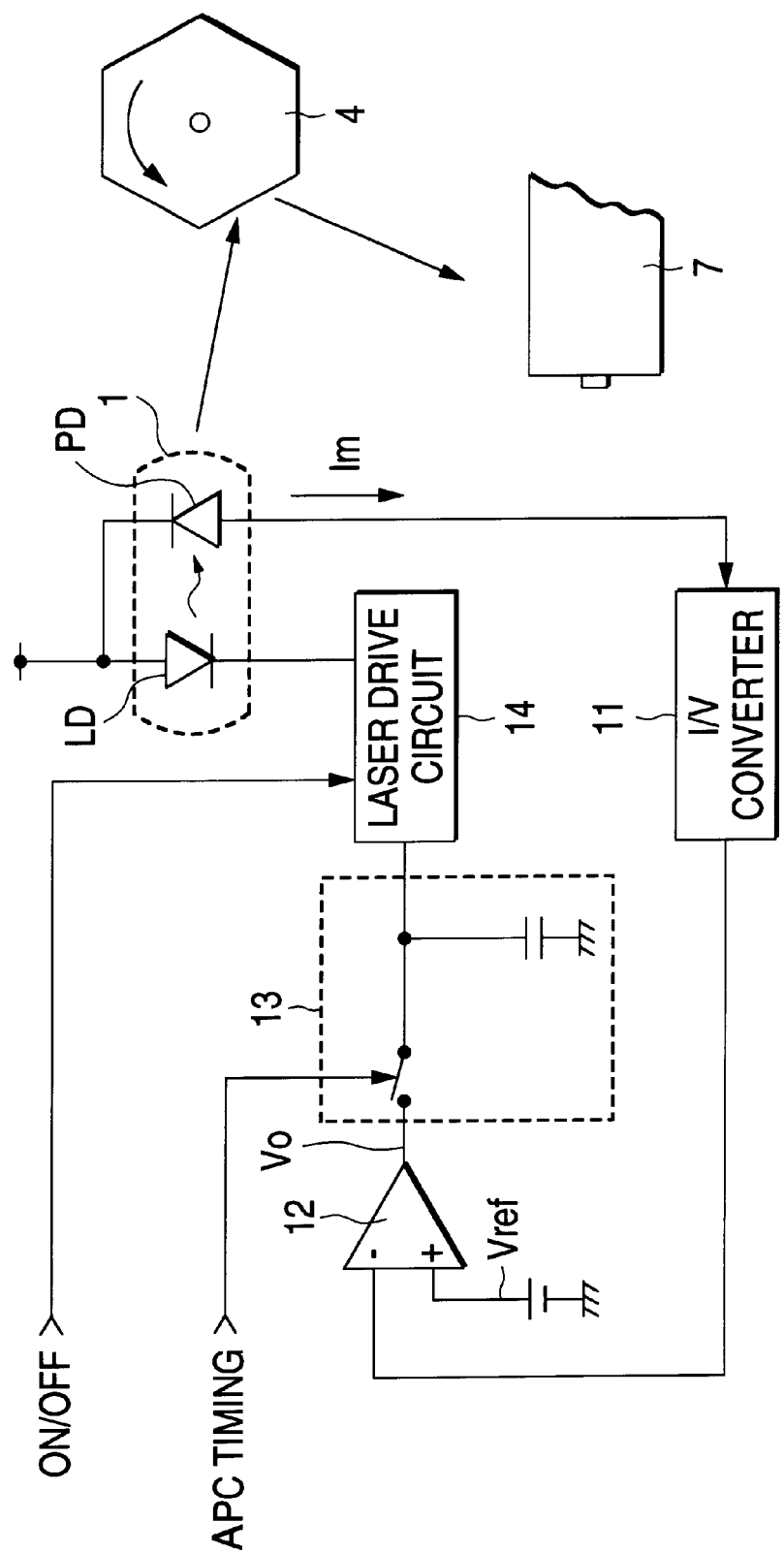
FIG. 5 is a circuit diagram of an exemplified APC circuit.

Thus, the optical intensity of laser light at the time of scanning with each reflecting surface, which is one previous rotation of the polygonal mirror, is stored in an associated sample and hold circuit. When the same reflecting surface performs the next scan, the laser power is controlled on the basis of that stored optical intensity. This ensures that the optical intensity of laser light reflected from each reflecting surface of the polygonal mirror is controlled at a specific level. Despite the variation in the reflectance of laser light from each reflecting surface of the polygonal mirror, the optical intensity of laser light can be controlled to be uniform at each of the scan lines on the photoreceptor drum, whereby uniform image density is produced at each scan line to realize the drawing of a high quality image. It is interesting to refer to FIG. 6 which is a timing chart describing the control of laser power by the APC circuit shown in FIG. 5. Obviously, the laser power of the laser diode LD can be controlled at a constant level. However, due to the variation in the reflectance of laser light from each reflecting surface of the polygonal mirror 4, there occurs a corresponding variation in the optical intensity of the laser light scanning the surface of the photoreceptor drum 7. The resulting variation in density between individual scan lines makes it difficult to achieve image drawing at uniform density.

In the apparatus described above, the polygonal mirror 4 has to rotate fully at least once in order to produce the corrected reference voltage Vref' and APC cannot be performed at startup in the manner described above. To deal with this situation, when the polygonal mirror is to rotate fully once for the first time, a reference signal is applied to have the reference selection switch 16 connected to the reference voltage Vref, on the basis of which the laser power is controlled. Therefore, even at startup, the comparator 12 will output an error voltage associated with the reference voltage and neither the laser drive circuit 14 nor the laser output control circuit 10 will put the laser diode LD in an overdriven state.

In the apparatus, the correction voltage is obtained by utilizing the detection output of the photosensor which is inherently intended to produce a scan timing signal. If desired, another photosensor may be provided for the sole purpose of producing the correction voltage. The photosensor 9 and the reflecting mirror 8 which are shown in FIG. 1 are provided in such positions as to detect the optical intensity of laser light in the neighborhood of the photoreceptor drum; this is not the sole case, as they may be located at any other positions such as right behind the polygonal mirror 4 as indicated by 9' and 8' or right behind the fθ lens 5 as indicated by 9" and 8". It should also be noted that the mechanism which stores the detection voltage from the photosensor is in no way limited to a sample and hold circuit. In one alternative, the detection voltage may be converted to a digital value which is stored in a semiconductor memory. In this case, the selector and the multiplexer employed in the apparatus are replaced by an address decoder and the like.

As described on the foregoing pages, the laser scan based recording apparatus is adapted to be such that the optical intensity of laser light emitted from a laser light source, and which has been reflected by any one of the reflecting surfaces of a rotatably driven polygonal mirror, is detected, stored, read out when the next laser light scan is performed with the same reflecting surface, and used as a basis for calculating the corresponding correction voltage, which is subsequently used to correct the reference voltage for controlling the laser power. Because of the design, the optical intensity of laser light reflected from the respective reflecting surfaces of the polygonal mirror can be controlled at a specified level even when those reflecting surfaces are varied in the reflectance of laser light. The variation in optical intensity among a plurality of scan lines on the photoreceptor is effectively eliminated to provide uniform image density, thereby realizing the drawing of high-quality images. In addition, at startup, APC is performed on the basis of the reference voltage, and the laser power is subjected to positive APC so that the overdrive of the laser diode is effectively prevented to protect it against breakdown and realize consistent and highly reliable laser power control.

What is claimed is:

1. A laser scan based recording apparatus in which laser light emitted from a laser light source is reflected by a polygonal mirror, having a plurality of reflecting surfaces, to scan a photoreceptor, said apparatus comprising:

a detecting system which detects an optical intensity of the laser light reflected from each of said reflecting surfaces of said polygonal mirror to measure a reflectance of said reflecting surfaces during a rotation of said polygonal mirror for scanning;

a storing system which stores detection outputs from said detecting system individually;

a reading system which reads one of the detection outputs stored by the storing system during the rotation of said polygonal mirror to control an emission output of said laser light incident on one of said reflecting surfaces during a subsequent rotation of said polygonal mirror, said one of said reflecting surfaces corresponding to the read one of the detection outputs;

a system which corrects a reference voltage in accordance with said detection output read by the reading system to output a corrected reference voltage; and a first emission control system which controls the emission output of said laser light source on the basis of said corrected reference voltage during the subsequent rotation of said polygonal mirror.

2. The laser scan based recording apparatus according to claim 1, wherein said detecting system includes a first photodiode for detecting optical intensity of the laser beam after being reflected by the polygonal mirror, and said first emission control system includes a second photodiode for detecting optical intensity of the laser beam before being reflected by the polygonal mirror.

3. The laser scan based recording apparatus according to claim 1, further comprising:

a second emission control system which controls the emission output of said laser light source on the basis of said reference voltage; and a reference selection system which selectively switches said first and second emission control systems to control the emission output of said laser light source.

4. The laser scan based recording apparatus according to claim 3, wherein said first and second emission control systems includes a common comparator for comparing a voltage indicative of said emission output of said laser light source with one of said reference voltage and said corrected reference voltage.

5. The laser scan based recording apparatus according to claim 1, wherein said reading system reads a previously stored detection output indicative of reflectance of an n+1-th reflecting surface, where n is a positive integer, when said storing system stores and updates a detection output indicative of reflectance of an n-th reflecting surface.

6. A laser scan based recording apparatus in which laser light emitted from a laser light source is reflected by a polygonal mirror, having a plurality of reflecting surfaces, to scan a photoreceptor, said apparatus comprising:

a system which detects an optical intensity of the laser light reflected from each of said reflecting surfaces of said polygonal mirror to measure a reflectance of said reflecting surfaces during a rotation of said polygonal mirror;

a system which stores detection outputs from said detecting system individually;

a system which reads a previously stored detection output for one reflecting surface of said reflecting surfaces when the laser light scans said one reflecting surface during a subsequent rotation of said polygonal mirror, the reflectance of said one reflecting surface having been measured;

a system which corrects a reference voltage in accordance with said detection output read by the reading system to output a corrected reference voltage; and a first emission control system which controls an emission output of said laser light source on the basis of said corrected reference voltage, wherein said storing system includes a number of sample and hold circuits, said number corresponding to a number of said plurality of reflecting surfaces.

7. A laser scan based recording apparatus comprising:

a laser diode;

a rotatably driven polygonal mirror having a plurality of reflecting surfaces for directing laser light from said laser diode to scan a photoreceptor;

a photosensor for detecting the laser light reflected from each of said reflecting surfaces;

a storage device that stores, for each of said reflecting surfaces, a voltage associated with an optical intensity detected with said photosensor during a rotation of said polygonal mirror for scanning, the voltage of each of said reflecting surfaces being stored in association with a corresponding one of the reflecting surfaces;

a reading system that reads said stored voltage from said storage device when said one of the reflecting surfaces associated with the read voltage is rotated to a scan position in a subsequent rotation of said polygonal mirror;

a computing device that calculates a correction voltage from the voltage read by said reading system and correcting a reference voltage on the basis of said correction voltage; and a laser output control circuit for controlling an emission output of said laser diode on the basis of the reference voltage thus corrected.

8. The laser scan based recording apparatus according to claim 7, wherein said laser output control circuit includes:

a monitoring photodiode which detects optical intensity of the laser light emitted by said laser diode;

a device that selects between the reference voltage and the corrected reference voltage;

an error comparator for comparing a detection output of said monitoring photodiode with the reference voltage selected by said selecting device, and outputting a resulting error voltage; and a laser drive circuit for controlling a drive current to be fed to said laser diode in association with said error voltage.

9. The laser scan based recording apparatus according to claim 8, wherein said selecting devices selects the reference voltage until said polygonal mirror fully rotates once for the first time.

10. The laser scan based recording apparatus according to claim 7, wherein said photosensor also detects the laser light being reflected by the polygonal mirror for scanning and outputs, a scan timing signal.

11. A laser scan based recording apparatus comprising:

a laser diode;

a rotatably driven polygonal mirror having a plurality of reflecting surfaces for directing laser light from said laser diode to scan a photoreceptor;

a photosensor for detecting the laser light reflected from each of said reflecting surfaces;

a storage device that stores, for each of said reflecting surfaces, a voltage associated with an optical intensity detected with said photosensor during a rotation of said polygonal mirror;

a reading system that reads said stored voltage from said storage device when said reflecting surface is rotated to a scan position in a subsequent rotation of said polygonal mirror;

a computing system that calculates a correction voltage from the voltage read by said reading system and correcting a reference voltage on the basis of said correction voltage;

a laser output control circuit for controlling an emission output of said laser diode on the basis of the reference voltage thus corrected;

sample and hold circuits, corresponding in number to a number of said plurality of reflecting surfaces of the polygonal mirror, which sample and hold detection outputs of said photosensor for the laser light reflected from respective reflecting surfaces;

a write selecting device that, in synchronism with rotation of the polygonal mirror, selects and causes a first one of the sample and hold circuits to perform sampling and holding operations; and a read selecting device that, in synchronism with the rotation of said polygonal mirror, selects a second one of the sample and hold circuits which leads said first one of the sample and hold circuits by one scan line, and reads voltage held in said second one of said sample and hold circuits.

12. A process for adjusting optical intensity of a laser beam to be emitted onto a photoreceptor by using a n-th surface of a rotating polygonal mirror, where n is a positive integer, to draw an image on the photoreceptor, said process comprising:

emitting the laser beam onto the n-th surface of the rotating mirror;

detecting an optical intensity of the laser beam reflected by the n-th surface during a predetermined rotation of said polygon mirror for scanning by using a first photodetector;

providing an output of the first photodetector indicative of the reflectance of the n-th surface detected during the rotation of said polygon mirror when the n-th surface is rotated to a scan position;

creating a reference value based on the provided output of the first photodetector during a subsequent rotation of said polygon mirror; and receiving the laser beam, which is not reflected by the n-th surface, by using a second photodetector, and carrying out a feed back control by comparing an output from the second photodetector during the subsequent rotation of said polygon mirror with the reference value.

13. A process according to claim 12, further comprising:

between the detecting and creating, drawing an image on the photoreceptor in a raster line by the laser beam reflected by the n-th surface; and after the receiving, drawing an image on the photoreceptor in another raster line by the laser beam reflected by the n-th surface.

14. A process according to claim 12, further comprising:

storing the output of the first detector when the laser beam is emitted onto the n-th surface during the predetermined rotation of the polygon mirror; and reading the thus stored output when the laser beam is emitted onto n−1-th surface during the subsequent rotation of the polygon mirror.

15. A process according to claim 12, further comprising:

emitting the laser beam on an image draw area of the photoreceptor while maintaining optical intensity of the laser beam controlled and set through the feed back control carried out in the receiving.

* * * * *